(12) United States Patent
Anastasov et al.

(10) Patent No.: US 9,479,310 B2
(45) Date of Patent: Oct. 25, 2016

(54) METHOD, APPARATUS AND SYSTEM TO COMMUNICATE WITH A DEVICE

(71) Applicant: Infineon Technologies AG, Neubiberg (DE)

(72) Inventors: Ljudmil Anastasov, Munich (DE); Kim Wee Ng, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 74 days.

(21) Appl. No.: 13/960,286

(22) Filed: Aug. 6, 2013

(65) Prior Publication Data

US 2015/0043688 A1 Feb. 12, 2015

(51) Int. Cl.
*H04L 7/00* (2006.01)
*H04L 7/04* (2006.01)
*H04L 5/00* (2006.01)
*G06F 1/04* (2006.01)

(52) U.S. Cl.
CPC ............. *H04L 5/0053* (2013.01); *H04L 7/00* (2013.01); *H04L 7/0008* (2013.01); *G06F 1/04* (2013.01)

(58) Field of Classification Search
USPC ....... 375/211, 214, 215, 216, 219, 220, 221, 375/222, 240, 240.26–240.29, 284, 285, 375/295, 316, 324, 325, 346, 347, 348, 349, 375/350, 354, 355, 356, 358, 362, 370, 368
See application file for complete search history.

(56) References Cited

U.S. PATENT DOCUMENTS

| | | | | |
|---|---|---|---|---|
| 6,720,943 | B1 * | 4/2004 | Lee | G09G 5/006 345/212 |
| 8,378,724 | B2 * | 2/2013 | David et al. | 327/157 |
| 9,001,950 | B2 * | 4/2015 | Asai | H03M 9/00 375/354 |
| 2005/0085935 | A1 * | 4/2005 | Ide | G11B 20/10527 700/94 |
| 2006/0023825 | A1 * | 2/2006 | Kato | G06F 13/4273 375/372 |
| 2010/0102869 | A1 * | 4/2010 | Stoler | G06F 1/08 327/298 |
| 2010/0162060 | A1 * | 6/2010 | Chakravarty | G01R 31/318552 714/731 |
| 2010/0189109 | A1 * | 7/2010 | Nakajima et al. | 370/395.1 |
| 2011/0026355 | A1 * | 2/2011 | Irisawa | 365/233.1 |
| 2011/0037759 | A1 * | 2/2011 | Fukuda | G09G 5/006 345/213 |
| 2013/0329828 | A1 * | 12/2013 | Lee | H04B 7/015 375/285 |
| 2014/0006677 | A1 * | 1/2014 | Iyer | G06F 13/4291 710/316 |

* cited by examiner

*Primary Examiner* — Linda Wong
(74) *Attorney, Agent, or Firm* — Eschweiler & Associates, LLC

(57) ABSTRACT

Described herein are implementations relating to a method for an apparatus to communicate with a device. One embodiment includes transmitting a clock signal to the device, receiving from the device, an asynchronous signal, and extracting information from the asynchronous signal based on the clock signal. In one embodiment the clock signal has a periodic elementary pattern. A period of the clock signal, in one embodiment encompasses, more than one clock cycle. Further disclosed are an apparatus to communicate with a device and a system for communication with a device.

15 Claims, 9 Drawing Sheets

METHOD, APPARATUS AND SYSTEM TO COMMUNICATE WITH A DEVICE

BACKGROUND

One control unit can be for control of one or more electric devices. Control communication with the electric devices can be by multiple data channels. A serial interface can provide for connection between the electric devices and the control unit through a serial link. Using the multiple data channels, parallel data can be sent out to the electric devices through a serial data stream to provide a synchronous downstream data transmission. Further, the control unit can receive feedback data sent from the electric devices in an asynchronous upstream data transmission.

With the data received from the control unit, the respective electric device can obtain information to generate a device clock signal. The respective electric device can use the generated device clock signal in the asynchronous upstream data transmission.

As requirements in terms of the amount of control data to be transmitted to electric devices and in terms of frequency of such control data transmissions to be performed become more stringent, time slots available for an individual control signal in a channel to be physically transmitted get shorter to a point where the conventional control is too unreliable to be safely used.

SUMMARY

Described herein are embodiments related to an apparatus to communicate with a device. A solution provides a method comprising transmitting to the device a clock signal having a periodic elementary pattern. The method can comprise receiving from the device an asynchronous signal and extracting information from the asynchronous signal based on the clock signal.

A solution comprises an apparatus to communicate with a device. The apparatus can be configured to provide a first signal and a second signal. The apparatus can further be configured to receive a third signal. The first signal can have a transition between two signal states, the second signal can have periodicity. A periodic elementary pattern can encompass at least one first cycle pattern. The periodic elementary pattern of the second signal can further comprise a second cycle pattern. The apparatus can be configured to extract information from the third signal based on a timing of the third signal being associated with a timing of the second signal.

A solution provides a system for communication with a device, comprising a clock unit configured to provide, at a clock output, a clock signal, the clock signal to comprise a periodic elementary pattern. The system may further comprise at least one signal unit to provide a control signal associated with the device that encompasses a transition between two signal states. The system can comprise at least one signal output coupled to the at least one signal unit by a plurality of signal paths, wherein, in the plurality of signal paths, each signal path has a length that differs from the length of any other signal path in the respective plurality of signal paths, and a selector operable to select, in the respective plurality of signal paths, one signal path for the associated control signal to travel.

Described herein are embodiments related to a control apparatus configured to control a device coupled to the control apparatus using a signal coupling. The signal coupling can be configured to provide multiple data channels in one link. The signal coupling can further be configured to provide a feedback channel in a further link.

The described embodiments can be useful in systems that employ a serial interface having a downstream channel for control signalling from a control apparatus to devices and an upstream channel for feedback from the respective device to the control apparatus. In one embodiment, asynchronous transmission can be performed in one channel while synchronous transmission is performed in the other channel. In one embodiment, asynchronous transmission can be performed while using at least two periodic timing signal elements. In comparison with conventional systems at least one effect is that more data can be transmitted.

This summary is submitted with the understanding that it will not be used to interpret or limit the scope or meaning of the claims. This summary is not intended to identify key features or essential features of the claimed subject matter, nor is it intended to be used as an aid in determining the scope of the claimed subject matter.

Figure 1:
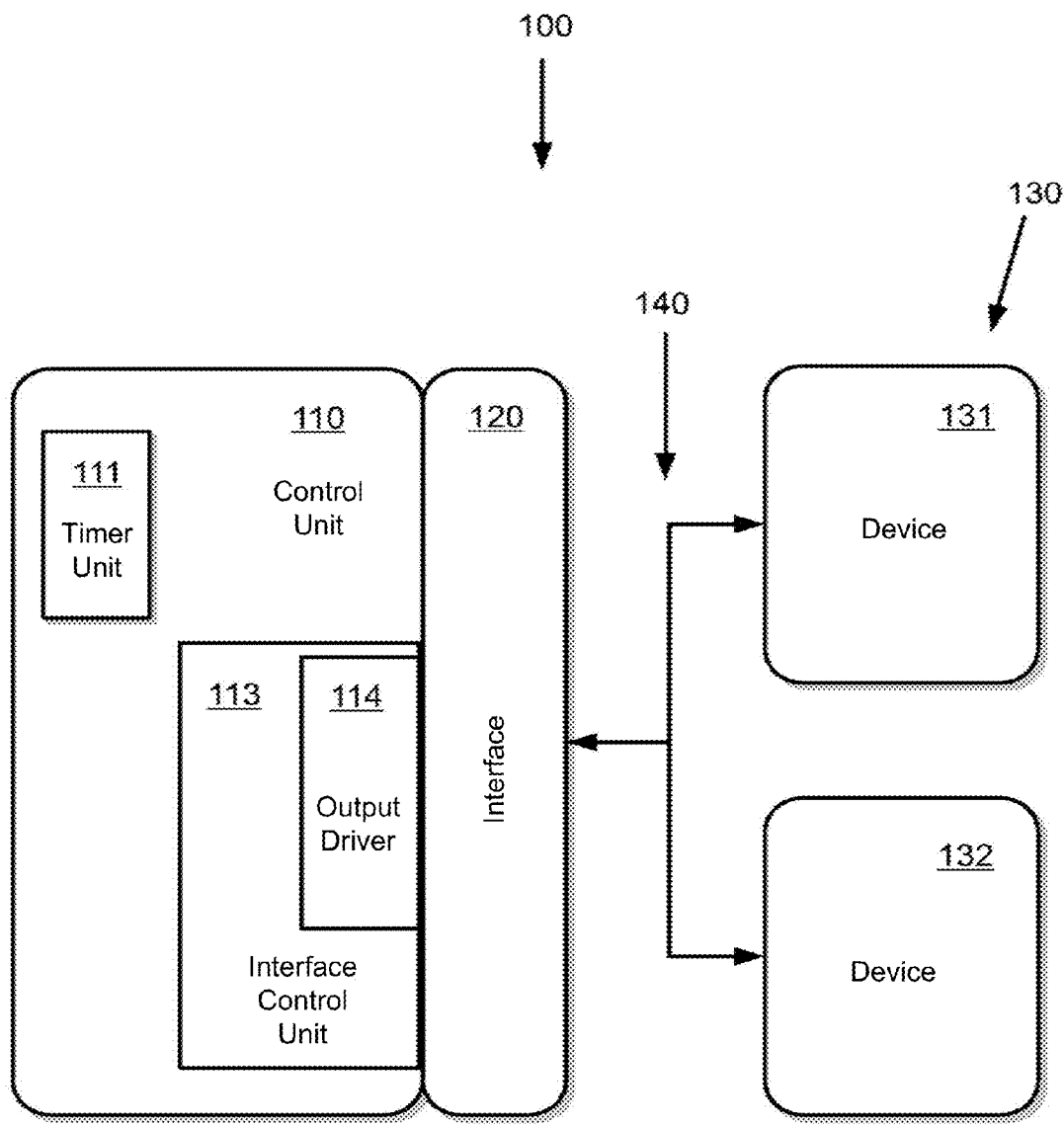
FIG. 1 is a block diagram illustrating a system in accordance with some embodiments.

The claimed subject matter is now described with reference to the drawings. In particular, the detailed description references the accompanying figures. In the figures, the left-most digit(s) of a reference number identifies the figure in which the reference number first appears. The same numbers are used throughout the drawings to reference like features and components. For purposes of explanation, numerous specific details are set forth in order to provide a thorough understanding of the claimed subject matter. It may be evident, however, that the claimed subject matter may be practised without these specific details.

DETAILED DESCRIPTION

Described herein are embodiments that in a first aspect relate to a method that comprises providing a first signal having a periodic transition between signal states. The first signal can be for transmission to a device. A purpose can be to control the device. The method can further comprise providing a second signal. The second signal can be for transmission to the device. The second signal can be periodic. The second signal can be a clock signal. The method can further comprise receiving an asynchronous signal. The receiving can be from the device. The method can comprise extracting information from the asynchronous signal based on the second signal. The second signal encompasses a first cycle pattern and a second cycle pattern. In the second signal, the second cycle pattern can be made to coincide with transitions in the first signal. In the second signal, the second cycle pattern can differ from the first cycle pattern. In an embodiment a difference between the first cycle pattern and the second cycle pattern can be in duration of the respective pattern.

At least one effect is that second cycle pattern can be provided to increase coincidence with transition in the first signal. Concurrence of transitions in the first signal and the second cycle pattern in the second signal enables detection of such transitions at the recipient electric device of the second signal. Typically, the longer an overlap between the transition in the first signal and the second cycle pattern in the second signal is, the more likely a correct detection of such transition can be. For example, the second cycle pattern can be to define a duration during which the first signal is sampled to detect a transition in the first signal. At a given sampling rate, the more the duration of sampling is extended the larger a likelihood to accurately detect transition.

In a variant of the first aspect, a method comprises providing a first signal, the first signal to encompass a transition between two signal states. The method further comprises providing a second signal, wherein the second signal has periodicity with an elementary signal pattern. The elementary signal pattern can encompass a first cycle pattern. The first cycle pattern in the second signal can comprise a first duration with the second signal in a first state and a second duration with the second signal in a second state. The second signal can further comprise a second cycle pattern that differs from the first cycle pattern. In particular, the second cycle pattern can differ with respect to the first duration, and/or with respect to the second duration. The second cycle patterns in the second signal are to coincide with a transition in the first signal. At least one effect of an embodiment according to the first aspect is to enable an application where control data are represented by a transition in the first signal, and a clock signal having first cycle patterns that are too short for safe data transmission can still be used nevertheless, since in the second cycle pattern the second signal is sufficient to detect transition in the control signal.

In an embodiment the method in the first aspect comprises receiving the control signal for use in device control. In an embodiment the method comprises receiving the clock signal for use in the construction of the asynchronous signal. In an embodiment the method comprises using the received control signal to construct the clock signal for use in the construction of the asynchronous signal. In an embodiment the control signal is digital. In an embodiment the clock signal is differential. In an embodiment the clock signal is digital. In an embodiment two second cycle patterns can be spaced apart by at least one first cycle pattern. One embodiment can use the clock signal for constructing the asynchronous signal to represent information.

In one embodiment, in the clock signal, the first cycle pattern is predetermined to comprise a first duration with the second signal in a first state and a second duration with the second signal in a second state. In one embodiment, further in the clock signal, the second cycle pattern is altered with respect to the first cycle pattern by at least one in a group consisting of the first duration and the second duration. In an embodiment in the first cycle pattern the first duration equals the second duration. In an embodiment in the second cycle pattern the first duration equals the second duration.

In an embodiment a difference between the first cycle pattern and the second cycle pattern can be in duration of the respective pattern. In one embodiment a duty cycle whose duration equals that of the first cycle pattern is extended to provide the second cycle pattern. At least one effect is an extension of the coincidence of the transition in the first signal and the second cycle pattern in the second signal. In one embodiment the extension is by adding a fraction of the first cycle pattern duration to the duty cycle. At least one effect of adding the fraction is that accidental timing errors are less likely to occur as a result of the dilatation in the second cycle pattern of the periodic second signal. So, in one embodiment, a duration of the second cycle pattern can be longer than a duration of the first cycle pattern. For example, in the first cycle pattern, the duration of the signal in the first state H equals or approximately equals the duration of the signal in the second state L, together to form a duration of a base period or base clock cycle. In the second cycle pattern, the duration of both, the signal in the first state H and the signal in the second state L can be extended, for example by fifty percent, to form a duration of an altered period or altered clock cycle that is fifty percent longer than the base period. In one other embodiment, the duration of the second cycle pattern equals the duration of the first cycle pattern. In the first cycle pattern, the duration of the signal in the first state H equals or approximately equals half the duration of the signal in the second state L, together to form a duration of a base period or base clock cycle. In the second cycle pattern the duration of the signal in the first state H can be doubled while the duration of the signal in the second state L can be halved, together to form a duration of an altered period or altered clock cycle that equals or approximately equals that of the base period. Other ratios of the duration of the signal in the first state H and the duration of the signal in the second state L can be used as well.

One embodiment can comprise determining the transition to occur in the control signal by counting periods in the clock signal. In an embodiment the method comprises determining the transition to occur by monitoring the control signal. In an embodiment the monitoring comprises writing a portion of the first signal into a buffer, determining if the portion comprises a transition, and reading the portion from the buffer.

Further described herein are embodiments that, in a second aspect, relate to an apparatus that is for device control. The apparatus can be configured to provide a first signal and a second signal. The apparatus can further be configured to receive a third signal. The first signal can have transition between two signal states. The second signal can have periodicity based on an elementary pattern with first cycle patterns. The elementary pattern of the second signal can further comprise a second cycle pattern to coincide with transition in the first signal. The apparatus can be configured to extract information from the third signal based on timing of the third signal being associated with timing of the second signal.

In a variant of the second aspect, an apparatus comprises a first unit is configured to provide, at a first output, at least one first signal, the first signal to encompass a transition between two signal states. The apparatus further comprises a second unit configured to provide, at a second output, a second signal. The second signal can have periodicity with an elementary pattern to provide first cycle patterns. The first cycle patterns can comprise a first duration with the second signal in a first state and a second duration with the second signal in a second state. The elementary pattern of the second signal can further comprise a second cycle pattern that differs from the first cycle pattern. In particular, the second cycle pattern can differ in a first duration, in a second duration, and/or in both. Instances of the second cycle pattern in the second signal are to coincide with the transition in the first signal.

Also described herein are embodiments that, in a third aspect, relate to a system that comprises a clock unit configured to provide, at a clock output, a clock signal. The clock signal can comprise a periodic elementary pattern having first cycle patterns. The system further comprises at least one signal unit to provide an associated control signal that encompasses a transition between two signal states. The system further comprises at least one signal output coupled to the at least one signal unit by a plurality of signal paths. In the plurality of signal paths, each signal path has a length that differs from the length of any other signal path in the respective plurality of signal paths. The system further comprises a selector operable to select, in the respective plurality of signal paths, one signal path for the associated control signal to travel.

At least one effect is that signal paths can be selected in order to improve an overlap between the transition in the first signal and individual second cycle patterns. As overlap is improved so is sampling of the first signal in the transition. Improved sampling may enable a reduction in overall signal time. In a given time, more data can be transmitted.

A serial interface is often used in systems with a control unit and one or more controlled devices. A typical control unit can be a micro-controller. Controlled devices are typically electrical or electronic devices such as, for example only, power devices. The serial interface can enable establishment of a coupling such as a physical link between the controller and the controlled devices. The link can be to support one or more channels that can enable, for example, command signalling, clock signalling, and/or data signalling. Typically, the signalling is from the control unit to the one or more controlled devices. However, the link can further be to support a channel for signalling feedback from the controlled device to the control unit. In a typical system, signalling from the control unit to the one or more controlled devices is synchronous, while signalling from the one or more controlled devices to the control unit is asynchronous. In a particular embodiment the system can be configured to bring parallel data from on-chip timer units or registers into a serial stream to be sent from the control unit to the controlled device. The serial stream can further comprise command information and/or clock information. Data at the controlled device, for example representative of status information, can be sent from the controlled device to the control unit.

FIG. 1 is a block diagram illustrating a system 100 in accordance with some embodiments. System 100 comprises a micro-controller 110 as a control unit, an interface 120 and controlled devices 130 coupled to micro-controller 110 via interface 120. A bus 140 is configured for coupling micro-controller 110 via interface 120 to controlled devices 130.

In the example embodiment of system 100 shown in FIG. 1, bus 140 is configured to link micro-controller 110 via interface 120 to devices 131 and 132. However, it is to be understood that the number of coupled devices 130 being two is merely for the purpose of demonstration. The number of electric devices 130 could differ. In particular, a maximum number of devices 130 that can be controlled by micro-controller 110 via interface 120 could be a design choice, and in a given implementation a particular number of devices 130 controlled could be determined by the requirements of the implementation wherein micro-controller 110 is used to control devices 130. Devices can, for example, encompass one or more in a group comprising power devices, application specific integrated circuits and other electronic components.

Figure 2:
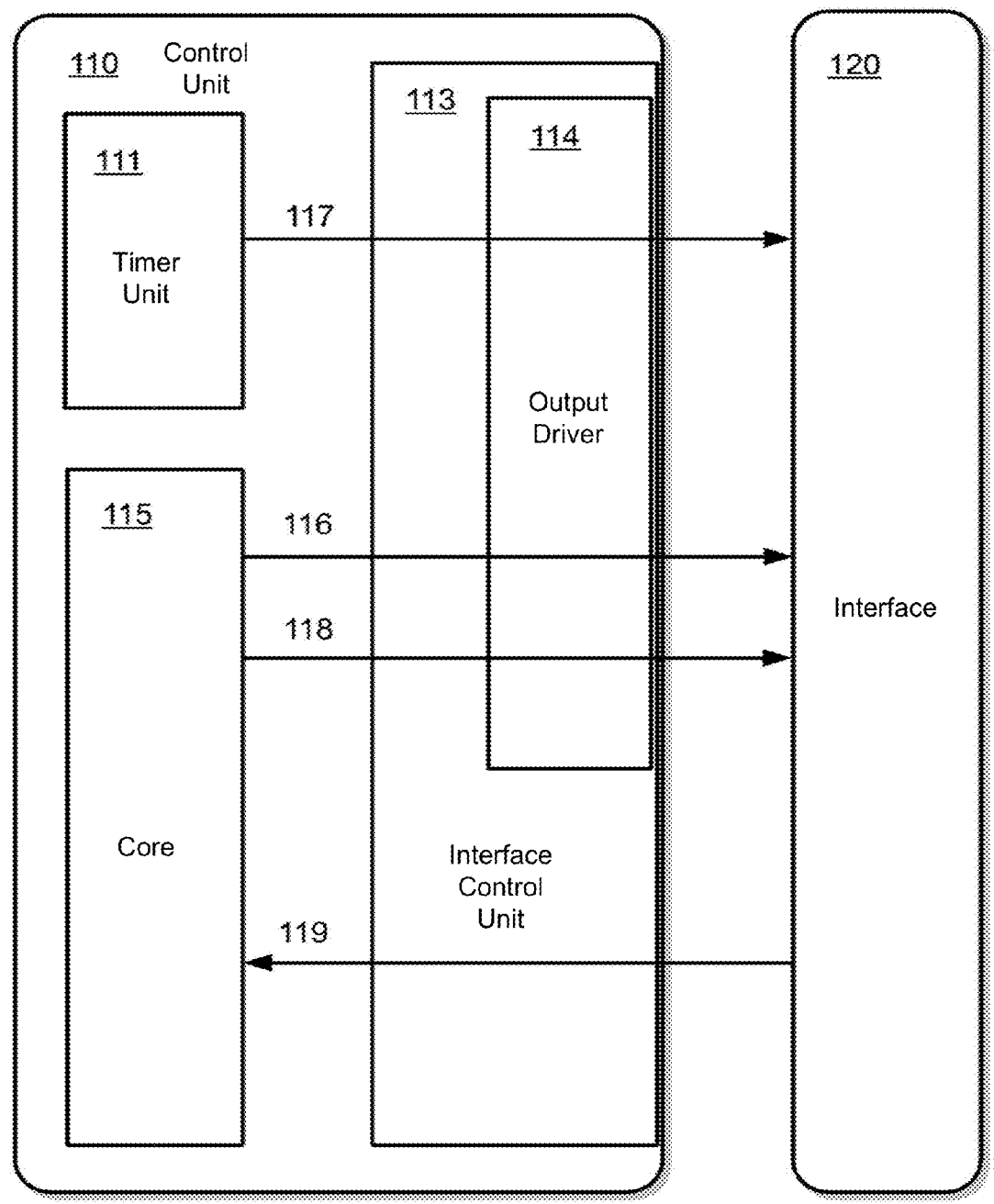
FIG. 2 is a block diagram illustrating a control unit in the system of FIG. 1.

FIG. 2 is a block diagram illustrating micro-controller 110 in more detail. In the example embodiment micro-controller 110 is configured for device control. To this end, as an example, micro-controller 110 comprises timer unit 111, internal bus (not shown), interface control unit 113, output driver portion 114 and core 115.

Timer unit 111 is configured to generate a clock signal. In an embodiment the clock signal can be provided at a clock output, in particular, for transmission to the device. Herein the term output generally encompasses any circuit element, wire, pad or other point in a signal transmission path, whence the signal can be transmitted to the device 130. In the example embodiment shown in FIG. 2, timer unit 111 provides the clock signal to output driver portion 114.

Interface control unit 113 can be configured to support, for example using the internal bus, any one of downstream channels 116, 117, 118 and upstream channel 119. In FIG. 2, channels 116 to 119 are represented by arrows that link timer unit 111 and core 115 with interface 120. It is understood that this representation is to show a logical link. The person skilled in the art will implement physical links in support of the logical links using dedicated lines, shared bus lines, circuit elements and/or logic elements. Firstly, downstream channels can comprise signal channel 118. In particular, signal channel 118 can be configured for enable signalling. Enable signals can be used to select one of devices 131, 132 for reception of clock, command and/or data to be transmitted. Secondly, downstream channels can comprise clock channel 117. In particular, clock channel 117 can be configured to transmit a clock signal as will be discussed in more detail below. In an embodiment, thirdly, downstream channels can also comprise serial data output channel 116. Serial data output channel 116 can be configured to output serial data to devices 131 and 132. In an embodiment, serial data output channel 116 is configured for output of serial data to all devices 131, 132 linked to micro-controller 110 by bus 140. Signal channel 118 can be used for enable signalling to tell devices 131, 132 at a given time in signal transmission which device should not ignore the data. Fourthly, upstream channel 119 can be configured as a serial data input channel. In particular, channel 119 can be configured for micro-controller 110 to receive a third signal. Micro-controller 110 can be configured to extract information from the third signal based on the third signal being asynchronous.

Output driver portion 114 can comprise so-called 'pads'. A pad can be circuitry, in particular integrated circuitry, configured to provide a signal suitable for a particular path for transmission to a recipient and/or signal processing at the recipient. The pad can comprise circuitry to provide ancillary functionality such as protection against electro-static discharges. For example, a pad can be configured to provide a digital signal. In particular, the pad could be configured to support transistor-transistor-logic (TTL) signalling. In an embodiment, a pad can be configured to provide a binary single ended signal with a high voltage state and a low voltage state, or to provide a binary differential signal with a transition between two states of opposite polarity. A pad can be designed to provide signals at a particular voltage level. For example, one pad can support a signal at a high voltage and another pad can support a signal having a low voltage, wherein in the terms 'high' and 'low' are meant to be relative with respect to some reference voltage as, for example, one that is typically used in processor operation, or in an ordinate sense, i.e., with reference to each other. Merely as an example, in one embodiment a high voltage might be 3.3 V while a small voltage might be 1.5 V. Pads in output driver portion 114 can further be configured to support a particular signal speed. Thus, one pad can support a signal to be fast and another pad can support a signal to be slow, wherein in the terms 'fast' and 'slow' are meant to be relative with respect to some reference speed, for example, in terms of signal frequency or in terms of baud per second, or in an ordinate sense, i.e., with reference to each other. Merely as an example, in one embodiment a fast pad might support a signal frequency of 60 MHz while a slow pad might still support a signal with a frequency of hundreds of kilohertz. Accordingly, in an embodiment, clock signals and/or data signals might be output at a fast pad, while select signalling might be output at a slow pad.

Figure 3:
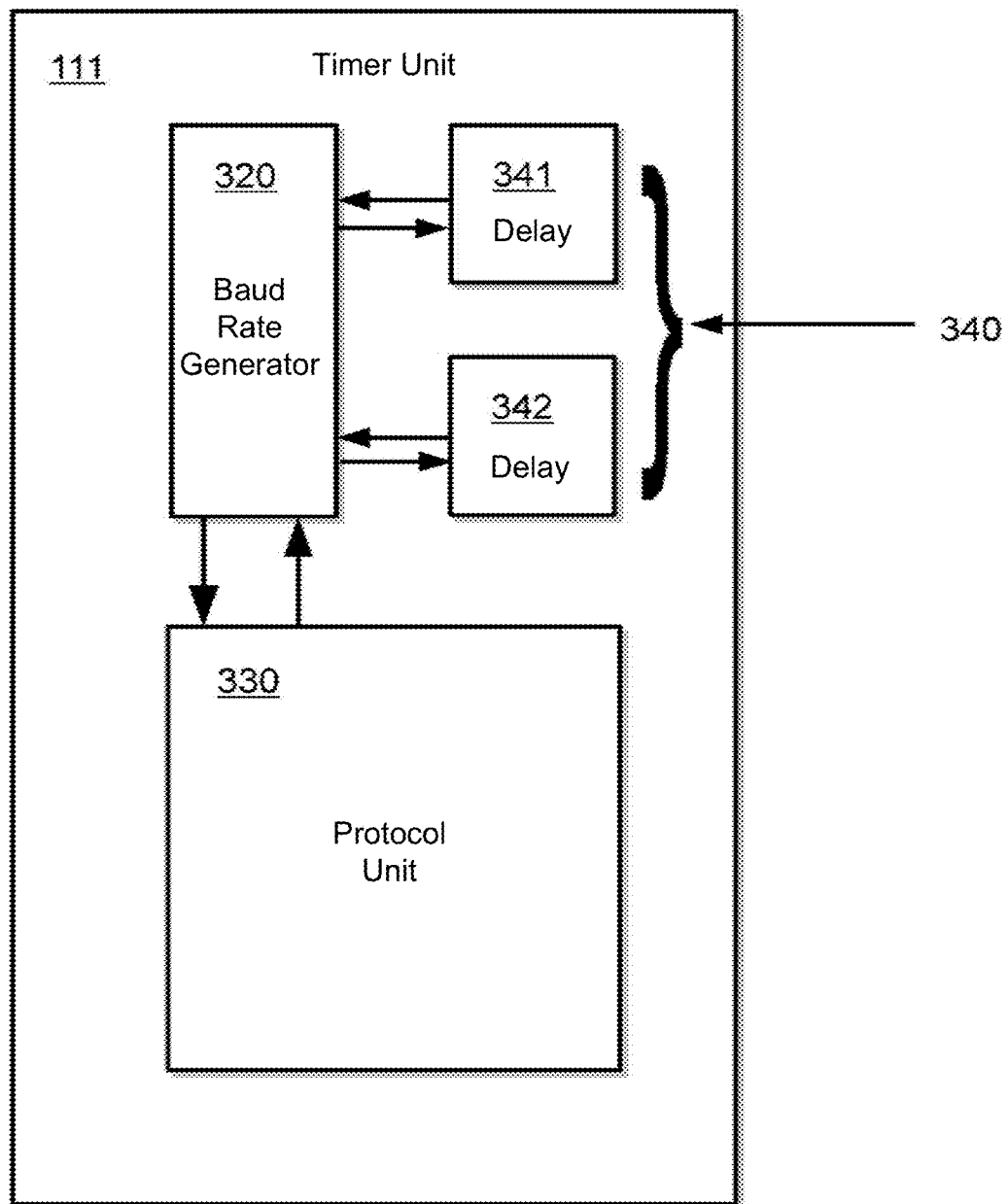
FIG. 3 is a block diagram illustrating a signal generator in the control unit of FIG. 2.

FIG. 3 illustrates timer unit 111 as a clock signal generator in micro-controller 110. Timer unit 111 comprises baud rate generator 320, protocol unit 330 and a set of delay units 340. Baud rate generator 320 is configured to generate the clock signal to be used in data transmission and data reception at micro-controller 110. Baud rate generator 320 is coupled to protocol unit 330 to provide the clock signal to protocol unit 330. Further, baud rate generator 320 is coupled to the set of delay units 340 to receive delay information for use in generation of the clock signal. In particular, in the set of delay units 340 a first delay unit 341 is configured to provide delay information to generate delay so as to extend duration of a low voltage level in the clock signal and a second delay unit 342 is configured to provide delay information to generate delay so as to extend duration of a high voltage level in the clock signal. Protocol unit 330 can be configured to provide signalling to baud rate generator 320 indicative of delay to be introduced in the clock signal. In one embodiment baud rate generator 320 is configured to cause, upon receiving request signalling from protocol unit 330, the set of delay units 340 to issue delay information in accordance with the signalled request.

Figure 4:
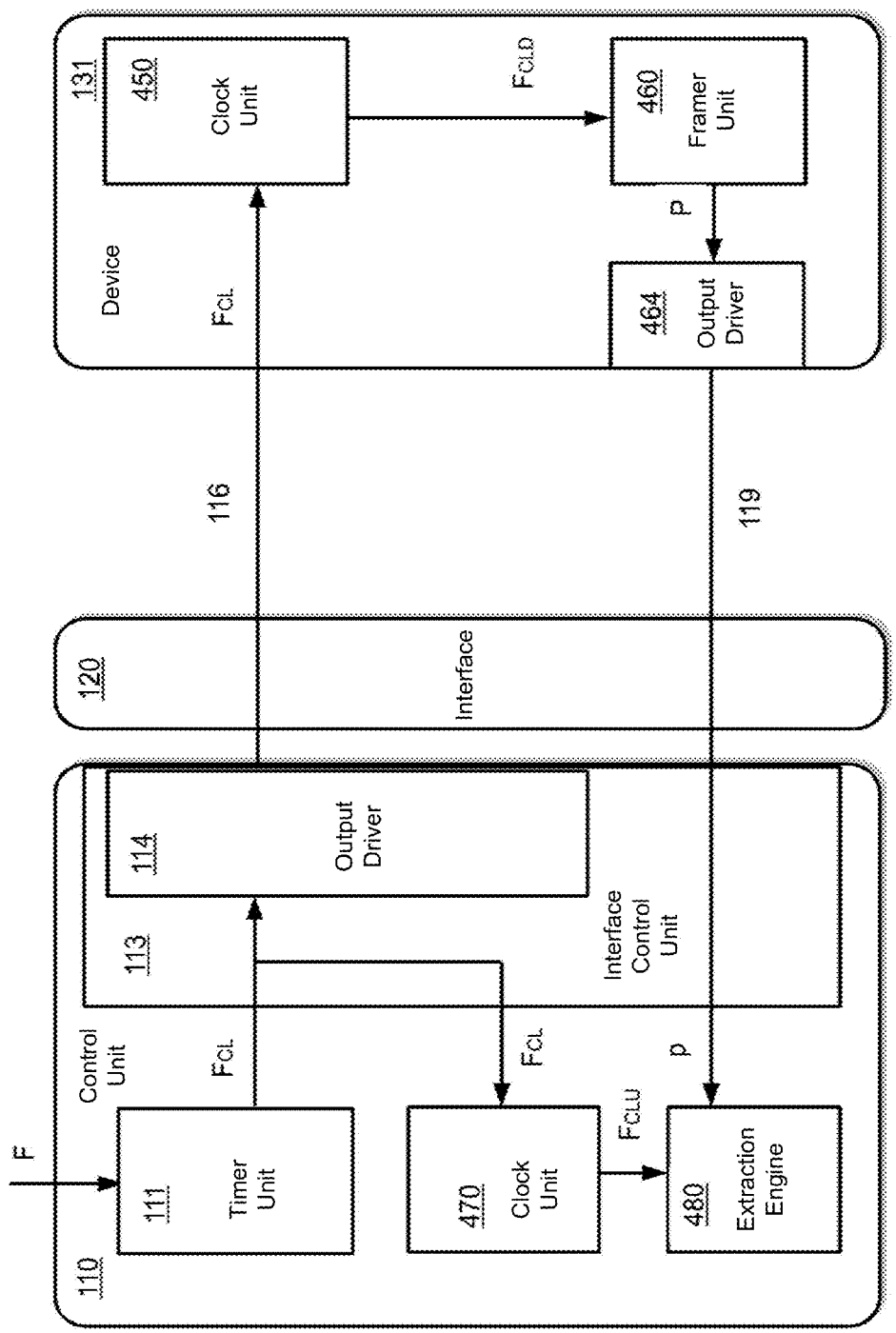
FIG. 4 is a block diagram illustrating a clock signal generator in the system of FIG. 1.

FIG. 4 is a block diagram illustrating a timing signal flow with the clock signal generator tied into the system of FIG. 1. In system 100, signal flow comprises upstream transmission of data from controlled devices 130 to micro-controller 110. In order to accommodate upstream transmission, in accordance with one embodiment, controlled device 131 has a device clock unit 450, a framer unit 460 and a device output driver 464. Micro-controller 110 has an upstream clock unit 470 and an extraction engine 480.

Now, signal flow in an implementation in system 100 will be described with reference to the drawings. Micro-controller 110 generates clock signal $F_{CL}$, for example, for use in command and data signalling. In an embodiment clock signal $F_{CL}$ is periodic. A period T comprises an elementary signal pattern that comprises multiple clock cycles. Below, embodiments with varieties of clock signal $F_{CL}$ will be disclosed in more detail.

Micro-controller 110 provides data signalling representative of data to be transmitted to devices 130. In an embodiment data can comprise commands. Data signals can represent data organized in frames. A frame can comprise data for some or all devices 131, 132 coupled to micro-controller 110. In an embodiment, a frame comprises slots. A slot can be associated with a device 131, 132. In an embodiment frames can be defined to comprise a predetermined number of slots. In an embodiment slots can be allocated in the time domain. Signals in time slots can be transmitted in succession. In one embodiment, data transmission is on a serial link with the slots in a frame to hold a data signal SO that represents data to be received by coupled devices 131, 132. In order to enable coupled devices 131, 132 to extract data from data signalling in slots associated with the respective device 131, 132, data signalling is synchronized to micro-controller clock signal $F_{CL}$. Given clock signal $F_{CL}$, device 131, 132 in receipt of the data signal from micro-controller 110 can count from a beginning of a frame received in the data signalling so as to identify a slot associated with the respective device 131, 132.

Further, micro-controller 110 generates enable signalling indicative of frame segments transmitted in data signalling. In particular, identifying a frame boundary enables to start counting slots in a frame anew. In an embodiment enable signalling is provided as a signal that comprises transitions from one signal state to another. The transitions mark boundaries between data frames. In one embodiment the enable signal is synchronized to micro-controller clock signal $F_{CL}$. In particular, transitions in the enable signal are to coincide with selected portions, in particular with selected clock cycles, in the clock signal $F_{CL}$. Thus, based on monitoring of transitions in the enable signalling, slots comprised in data signalling can be discerned. In one embodiment, consecutive slots can be associated with different devices in a predetermined sequence. In an embodiment monitoring can comprise writing a portion of the first signal into a buffer, determining if the portion comprises a transition, and reading the portion from the buffer. Monitoring enable signalling for transitions, respective devices 131, 132 can identify associated slots in the data signal and process the associated data, respectively.

In the example system clock signals can travel as follows: Micro-controller-internal frequency signal f is provided to timer unit 111. Timer unit 111 processes frequency signal f to generate clock signal $F_{CL}$. Clock signal $F_{CL}$ is provided to both output driver 114 controlled by interface control unit 113 and to upstream clock unit 470.

Using interface 120, output driver 114 dispatches clock signal $F_{CL}$ to device 131 wherein, for example, using bus 140 (not shown in FIG. 4), clock signal $F_{CL}$ travels along downstream clock channel 116 via interface 120. In one embodiment, a respective device 131, 132 in the set of devices 130 coupled to micro-controller 110, receives clock signal $F_{CL}$.

In device 131, clock signal $F_{CL}$ is provided to device clock unit 450. Device clock unit 450 provides device clock signal $F_{CLD}$ to device frame unit 460. Device clock unit 450 provides the device clock signal $F_{CLD}$, for example, for use in data processing and/or for use in transmission of data from device 131, 132 to micro-controller 110. In one embodiment device clock signal $F_{CLD}$ is based on clock signal $F_{CL}$ received from micro-controller 110. In one embodiment, clock unit 450 connects clock signal $F_{CL}$ through so as to form device clock signal $F_{CLD}$. Device framer unit 460 uses device clock signal $F_{CLD}$ in framing device data for transmission. In one embodiment, transmission from device 131 to micro-controller 110 is to be asynchronous. In device 131 framer unit 460 provides data packets to device output driver 464 for transmission from device 131 to micro-controller 110. Device output driver 464 dispatches packet signal p onto bus 140 (not shown in FIG. 4) for delivery to micro-controller 110. Using bus 140 (not shown in FIG. 4), transmission of packet signal p is along upstream channel 119 via interface 120.

Meanwhile, in micro-controller 110, upstream clock unit 470 receives clock signal $F_{CL}$. In one embodiment, upstream clock unit 470 provides the upstream clock signal $F_{CLU}$, for example, for use in extraction of data received at micro-controller 110 from device 131, 132. Upstream clock signal $F_{CLU}$ is based on clock signal FCL received from micro-controller 110. In one embodiment, upstream clock unit 470 connects clock signal $F_{CL}$ through so as to form upstream clock signal $F_{CLU}$. Upstream clock unit 470 provides upstream clock signal $F_{CLU}$ to upstream extraction engine 480. Upstream extraction engine 480 can shift upstream clock signal $F_{CLU}$ so as to enable extracting information from packets in packet signal p received from device 131, 132. At least one effect of using upstream clock signal $F_{CLU}$ can be that information can be extracted from packet signal p even if packet signal p is asynchronous.

Figure 5:
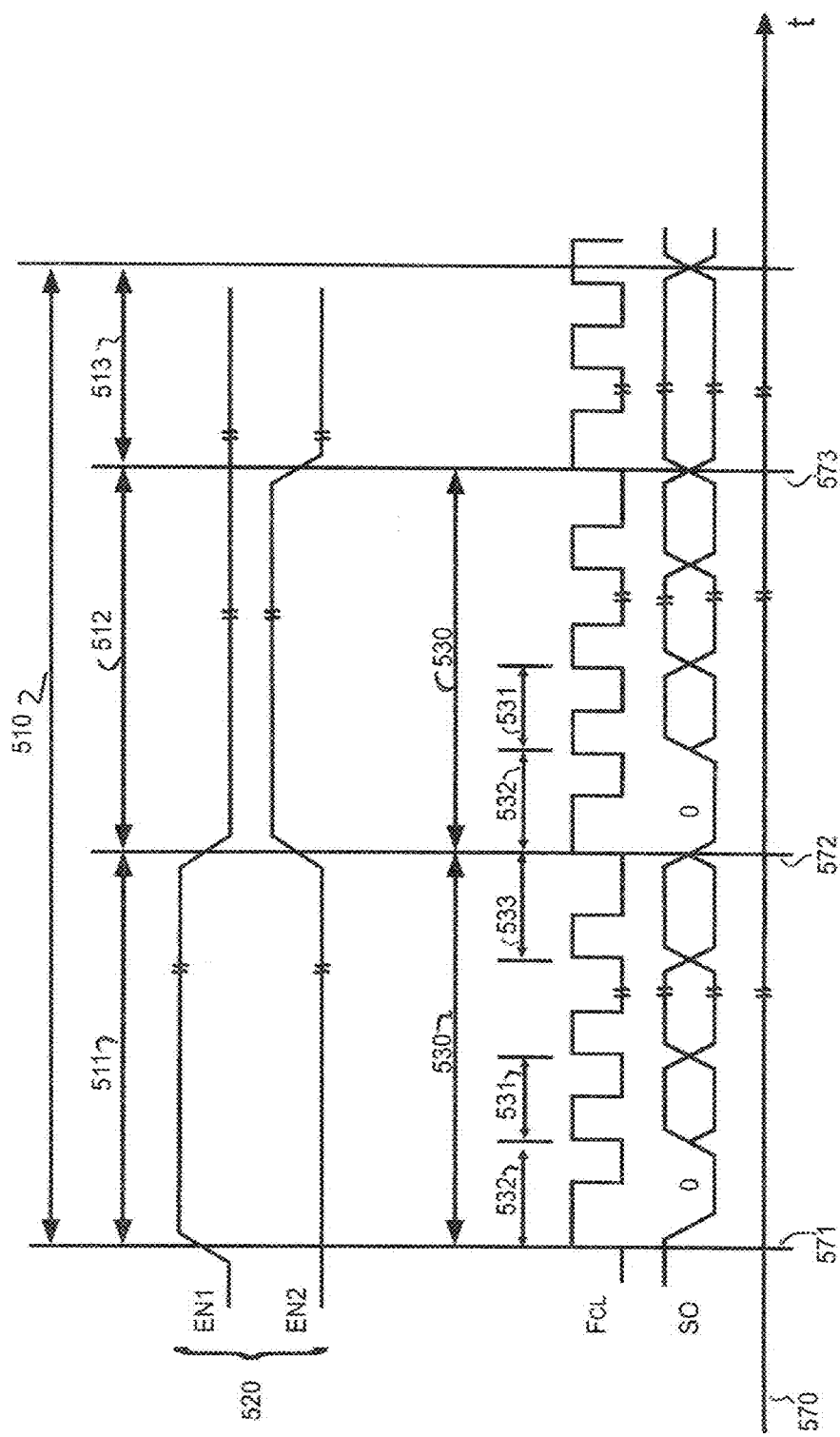
FIG. 5 is a diagram illustrating signals that are output from the control unit of FIG. 1 in accordance with some embodiments.

Now, signalling will be described in more detail. FIG. 5 is a diagram illustrating signals that are output from the control unit of FIG. 1 in accordance with some embodiments, for example, in one embodiment via interface control unit 113 of micro-controller 110. FIG. 5 illustrates, as a sequence in time represented by time line 570, signalling of micro-controller 110 to transmit to set of devices 130 data organized in a data frame 510.

Having regard to data organization, data frame 510 is shown to comprise at least frame segments 511, 512, 513. Data held in one data frame segment 511, 512, 513 are to be transmitted to one associated device in the set of devices 130. In an example embodiment the association is predetermined or preset prior to device control operation of micro-controller 110. In one embodiment the association can be modified in operation, for example, to take into account inactivity of certain devices that, while inactive, may not need to be fed any data. In the example shown in FIG. 5, data in frame segment 511 are associated with device 131, and data in frame segment 512 are associated with device 132. In a segment 511, 512 parallel data bits 1, . . . , n are arranged sequentially. In the embodiment shown in FIG. 5, frame segment 513 is shown to not hold any data. However, in another embodiment frame segment 513 as well as additional frame segments, if comprised in data frame 510, can have data.

Having regard to identifying successive data frame segments 511, 512 in data frame 510, micro-controller 110 provides first signals 520 (herein also referred to as 'enable signals') that are to select one frame segment as active. In one embodiment, enable signal 520 is provided as a two-component signal with signal components 'enable low' EN1 and 'enable high' EN2. Active level in a signal component EN1, EN2 can be defined to indicate association of data transmitted during active level with a respective device 131, 132. Therefore, herein, signal components EN1 and EN2 of enable signal 520 are also called select signals or enable signals. It is to be understood that the maximum number of devices in the set of devices is a design choice the person skilled in the art will make in accordance with the application of the particular design. Merely as an example, FIG. 1 shows two devices 131, 132 to be coupled to micro-controller 110, while FIG. 5 shows a data frame that is designed to comprise data directed to further devices. In the example embodiment, there can be as many controlled devices 131, 132 as there are parallel lines in bus 140 dedicated to selection (select lines), each select line to support one select signal EN1, EN2.

In the example shown in FIG. 5, first signal component EN1 is shown, at a first time 571, to transit from signal level 'enable low' to signal level 'enable high'. At a second time 572, first signal component EN1 is shown to transit from signal level 'enable high' to signal level 'enable low'. Thus, activation of first device 131 associated with first signal component EN1 during the time between first time 571 and second time 572 is indicated. Further, second signal component EN2 is shown, at second time 572, to transit from signal level 'enable low' to signal level 'enable high'. At a third time 573, second signal component EN2 is shown to transit from signal level 'enable high' to signal level 'enable low'. Thus, activation of second device 132 associated with second signal component EN2 during the time between second time 572 and third time 573 is indicated.

Micro-controller 110 provides clock signal $F_{CL}$. Clock signal $F_{CL}$ alternates or toggles between two signal states, for example high and low. One round of toggling—the clock signal going through signal state high and signal state low or vice versa—defines a clock cycle. In an embodiment, clock signal $F_{CL}$ is digital. Clock signal $F_{CL}$ is periodic. One period of clock signal $F_{CL}$ defines an elementary clock signal pattern. The elementary signal pattern of clock signal $F_{CL}$ can cover a sequence of predetermined frame segment signal portions that last for a frame segment period 530. Frame segment signal portions can encompass multiple bit signal portions. In an embodiment a bit signal portion is defined by one clock cycle. In particular, frame segment signal portions comprise one or more base bit signal portions that each last for a base bit signal period 531. In addition, frame segment signal portions comprise at least one bit signal portion that differs from the base bit signal portion and lasts for an altered bit signal period 532, 533.

Micro-controller 110 is configured to provide data signal SO, herein also referred to as 'serial out' data signal SO. Data signal SO is to represent data bits. In an embodiment data signal SO is synchronized with clock signal $F_{CL}$. In particular, data signal SO can be so as to represent one bit in one clock cycle of clock signal $F_{CL}$. Thus, data signal SO represents data sequentially. In an embodiment, data signal SO is differential.

Figure 6:
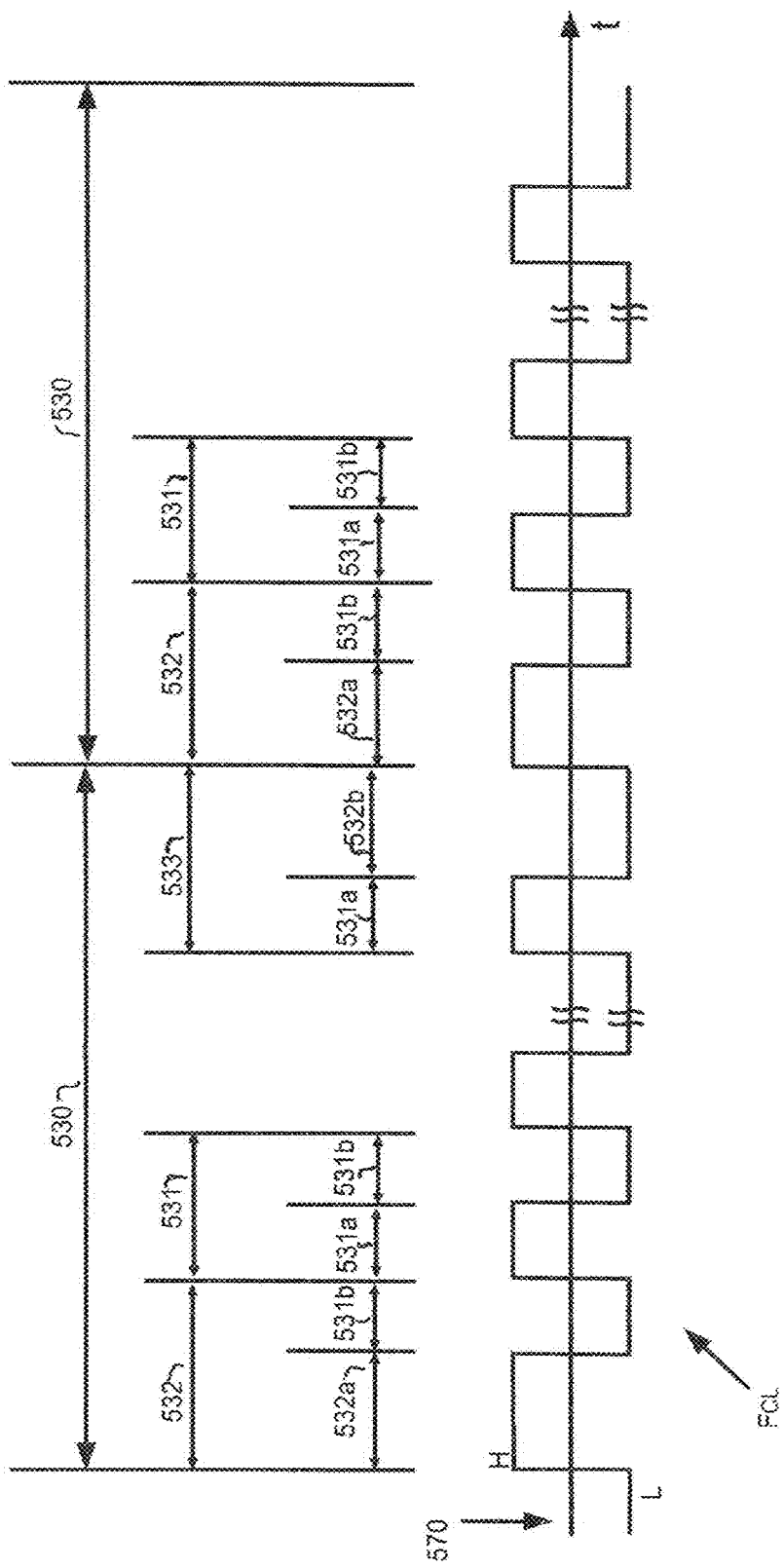
FIG. 6 is a diagram illustrating one signal of FIG. 5 in more detail.

FIG. 6 is a diagram illustrating timing of clock signal $F_{CL}$ in one embodiment in more detail. Base bit signal period 531 is made up of a first duration 531a with digital clock signal $F_{CL}$ in a first state H and a second duration 531b with clock signal $F_{CL}$ in a second state L to form a first cycle pattern. In an embodiment the $F_{CL}$ further encompasses a first altered bit signal period 532 with a second cycle pattern. First altered bit signal period 532 that is made up of a third duration, herein also referred to as first altered duration 532a, with digital clock signal $F_{CL}$ in a first state H and the second duration 531b with clock signal $F_{CL}$ in a second state L. In one embodiment the extension is by adding an odd fraction of first cycle pattern duration to the duty cycle. For example the duration of the duty cycle can be extended by 50%. At least one effect of adding the odd fraction as opposed to an even fraction is that accidental timing errors are less likely to occur as a result of the dilatation in the second cycle pattern of the periodic second signal. In an embodiment monitoring comprises writing a portion of the first signal into a buffer, determining if the portion comprises a transition, and reading the portion from the buffer. In an embodiment the second signal is digital. In an embodiment the second signal is a clock signal. In an embodiment, as shown in FIG. 6, frame segment period 530 comprises a second altered bit signal period 533 with a third cycle pattern that is made up of the first duration 531a with digital clock signal $F_{CL}$ in the first state H and a fourth duration, herein also referred to as second altered duration 532b, with digital clock signal $F_{CL}$ in the second state H.

Herein, the term 'altered duration' means modified with respect to a corresponding duration of the first state H and the second state L, respectively, in the base bit signal portion in clock signal $F_{CL}$. In an embodiment as shown in FIG. 5 and FIG. 6, the term 'altered' relates to the duration of the clock signal $F_{CL}$ in a signal portion holding a signal level H or L. For example, first altered bit signal period 532 is longer than base bit signal period 531, since the first signal level H is kept during the first altered duration 532a which is longer than the first duration 531a. Similarly, second altered bit signal period 533 is longer than base bit signal period 531, since the second signal level L is kept during the second altered duration 532b which is longer than the second duration 531b. In the example shown, the difference between first altered bit signal period 532 and base bit signal period 531 is the same as between second altered bit signal period 533 and base bit signal period 531. Further, the person skilled in the art will readily understand that other definitions are equivalent to the definition shown in FIG. 6. For example, the first duration could be defined with clock signal FCL in the second state L while the second duration would be defined with clock signal FCL in the first state H. At least one effect is that frame segment period 530 in clock signal FCL can cover multiple clock cycles that are not all the same. At least one clock cycle in frame segment period 530 may differ from the other clock cycles in the frame segment period 530. Thus, in an embodiment, in the clock signal, two altered bit signal periods 532, 533 with second (and third) cycle patterns can alternately be spaced apart by at least one base bit signal period 531 first with the first cycle pattern, as in the present example third cycle pattern 533 is spaced from second cycle pattern 532 by first cycle pattern 531, and be consecutive, as in the present example second cycle pattern 532 immediately follows the third cycle pattern 533.

The difference between clock cycle patterns can be in terms of duration of keeping signal level H and/or signal level L in the at least one different clock cycle. In an embodiment one signal level can be extended at the expense of the other signal level so as to keep the clock cycle duration of the at least one different clock cycle the same as the duration of the other clock cycles.

Figure 7:
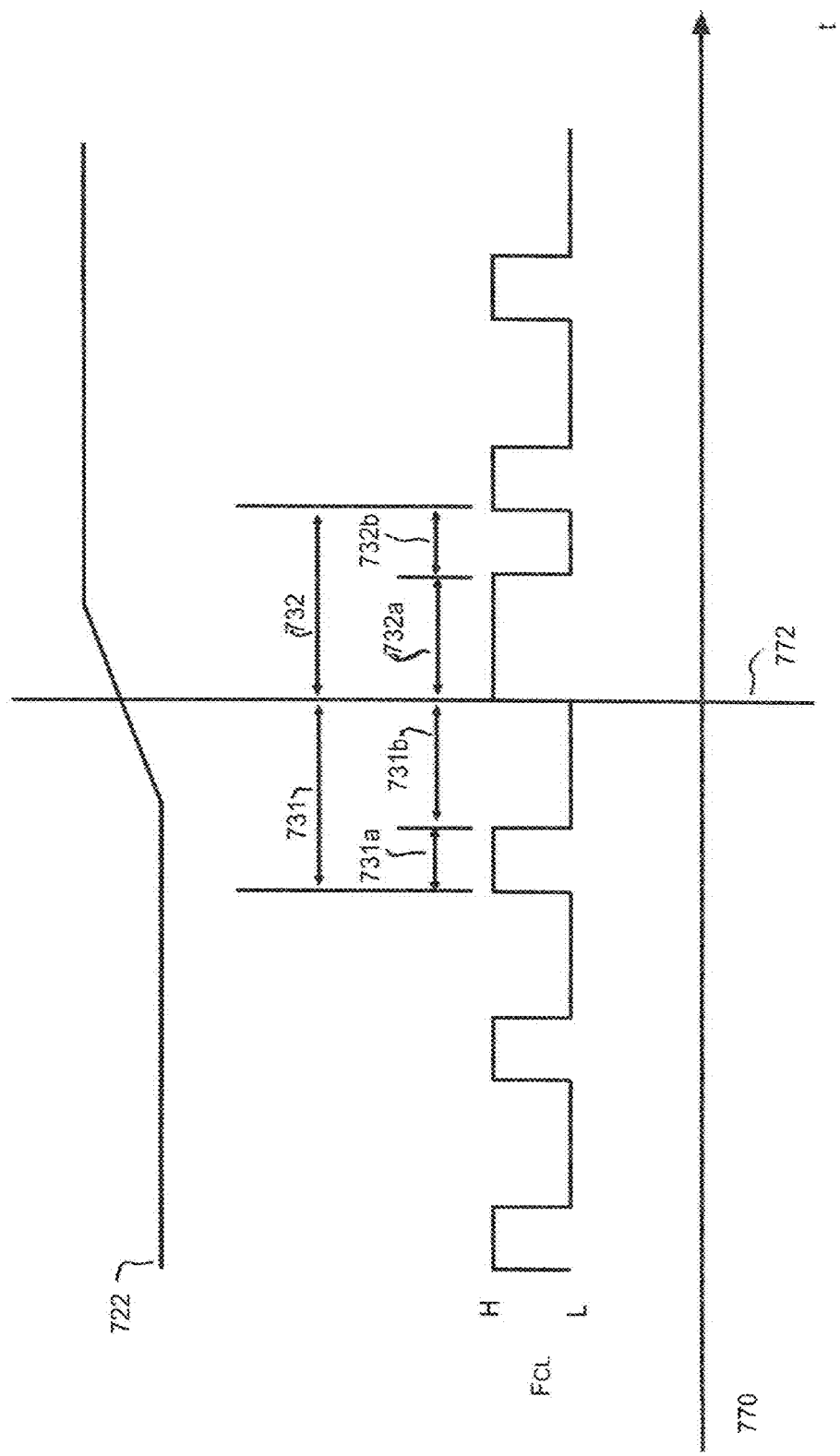
FIG. 7 is diagram illustrating signals in accordance with some embodiments.

FIG. 7 shows an example of such an embodiment. In clock signal $F_{CL}$, base bit signal period 731 is made up of a first duration 731a with digital clock signal $F_{CL}$ in a first state H and a second duration 731b with clock signal $F_{CL}$ in a second state L to form a first cycle pattern wherein the first duration 731a is shorter than the second duration 731b. A second cycle pattern 732 "mirrors" the duty cycle of the first pattern. Thus, in the second cycle pattern 732, a duration 732a of the digital clock signal $F_{CL}$ in the first state H equals the duration 731b of the digital clock signal $F_{CL}$ in the second state L in the first cycle pattern, and, still in the second cycle pattern 732, a duration 732b of the digital clock signal $F_{CL}$ in the second state L equals the duration 731a of the digital clock signal $F_{CL}$ in the first state H in the first cycle pattern. Compared with the embodiment (A) an effect of embodiment (B) can be that the duration of the second clock cycle 732 can be the same as that of the first clock cycle 731.

In one embodiment 'extension' of duration 532, 732 of the second cycle pattern in comparison with duration 531, 731 of the first cycle pattern is achieved by adding an odd fraction of first cycle pattern duration 531, 731 to the duty cycle of the first cycle pattern duration 531, 731. At least one effect of adding the odd fraction, as opposed to adding an even fraction, is that accidental timing errors are less likely to occur as a result of the dilatation in the second cycle pattern of the clock signal $F_{CL}$.

Referring back to FIG. 5, first signals 520, i.e., activation signals EN1 and EN2, select signals EN1 and EN2 or enable signals EN1 and EN2, are slow in comparison with second signal (clock signal $F_{CL}$) and third signal (serial output data signal SO). For example, select signal EN1 to change from one state to another state can take a multiple amount of time of clock signal to change from one state to another state. In an embodiment depicted in FIG. 5, altered bit signal periods 532 and 533 coincide with a transition in first signals 520, i.e., the relatively 'slow'. For example, at second time 572, the second altered bit signal period 533 ends and the first altered bit signal period 532 begins. More particularly, the second altered duration 532b ends and the first altered duration 532a begins. Since first altered duration 532a and second altered duration and 532b are extended with respect to first duration 531a and second duration 531b, respectively, there is an extended duration of coincidence of transition in first signals 520 and altered signal period of clock signal $F_{CL}$ when compared with the duration of coincidence of transition in the first signals 520 if clock signal $F_{CL}$ did only consist of base signal periods. In an embodiment where detection of a transition in signal state of first signals 520 is performed by sampling in one or two periods of the clock signal $F_{CL}$, at least one effect of the aforedescribed extension in duration of the altered bit signal periods clock signal can be to allow for more sampling time and thus more precision in detection of transition. Another effect can be to keep a duration for sampling the transition at a conventional length while shortening the base clock periods so as to increase data throughput from microcontroller 110 to device 130.

In an implementation an apparatus comprises a first unit configured to provide, at a first output, at least one first signal, the first signal to encompass a transition between two signal states, a second unit configured to provide, at a second output, a second signal, the second signal to have periodicity with an elementary pattern. First signal and second signal can be for transmission from the apparatus to a device coupled to the apparatus. The apparatus can further have a receive unit to receive a device signal from the device. In an embodiment the elementary pattern can encompass at least one first cycle pattern. In an embodiment the first cycle pattern can comprise a first duration with the second signal in a first state and a second duration with the second signal in a second state. The periodic elementary pattern in the second signal can further comprise second cycle patterns that differ from the first cycle pattern in at least one in a group consisting of the first duration and the second duration. In an embodiment the second cycle patterns are to coincide with a transition in the first signal. In an embodiment the first unit is configured to provide, in parallel, a plurality of first signals. In an embodiment, for each of the first signals, the first unit comprises a plurality of signal paths. Each path in the respective plurality of signal paths has a length that differs from the length of any other path in the respective plurality of signal paths. In an embodiment the apparatus can further comprise a selector operable to select, in the respective plurality of signal paths, one path for the respective signal to travel. At least one effect is that a path can be selected so as to achieve signal travel time adapted to a period in the elementary periodic pattern. For example, signal travel time can be selected so as to obtain, for a signal travelling from the apparatus to the device and for the device to transmit the device signal to the apparatus, a receive device signal aligned with, for example at least approximately in phase, with the apparatus second signal. In an embodiment the apparatus comprises a fine clock configured to generate a fine clock signal. The fine clock signal can be for use in generating the second signal. In an embodiment the second unit is configured to space apart two successive second cycle patterns in the periodic elementary pattern by at least one first cycle pattern.

In an embodiment the second unit is configured to monitor the first signal to determine the transition in the first signal. The apparatus can further comprise a buffer that is coupled to the second unit. The second unit can be configured to perform one or more of the following: to write a portion of the first signal into the buffer, to determine if the portion comprises a transition, to read the portion from the buffer, and to provide the portion to the first output. In an embodiment the duration of the second cycle pattern equals the duration of the first cycle pattern. In an embodiment the first unit is configured to provide the first signal type as a periodic signal. In an embodiment the second unit is configured to count periods in the second signal in order to determine the transition occurrence in the first signal.

According to one aspect a system comprises a clock unit configured to provide, at a clock output, a clock signal. The clock signal can be periodic. In an embodiment the clock signal comprises first cycle patterns. The system can comprise at least one signal unit configured to provide a control signal that encompasses transition between two signal states. Further the system can comprise at least one signal output coupled to the at least one signal unit by a plurality of signal paths. In an embodiment, in the plurality of signal paths, each signal path has a length that differs from the length of any other signal path in the respective plurality of signal paths. In an embodiment the system comprises a selector operable to select, in the respective plurality of signal paths, one signal path for the control signal to travel. At least one effect can be to enable selection of a signal path in accordance with signal processing performed so as to adapt to timing requirements. In an embodiment a timing requirement can be perform a combination of signal travelling and signal processing in one or multiple periods of the clock signal.

In one embodiment the selector is configured to select the signal path so as to minimize a number of cycles in the periodic clock signal coincident with a transition in the associated control signal.

In an embodiment a second cycle pattern in the periodic clock signal to coincide with a transition in the control signal is altered with respect to the first cycle pattern in the clock signal. Alteration in the cycle pattern in the periodic clock signal can be in ratio, in one clock cycle, of a first duration of the clock signal being in a first state to a second duration of the clock signal being in a second state. In one embodiment alteration in the cycle pattern in the periodic clock signal is in duration of the cycle pattern.

Figure 8:
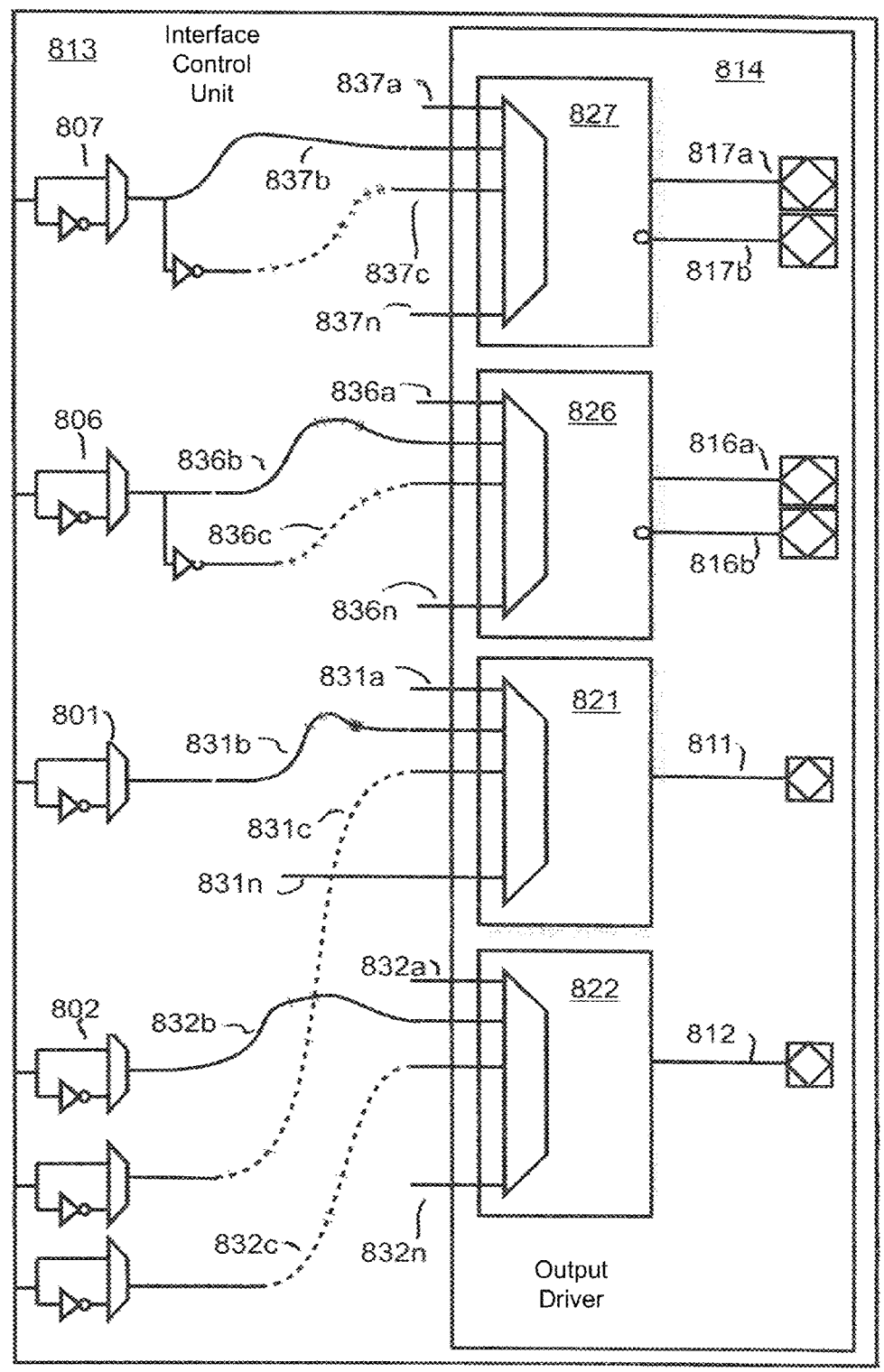
FIG. 8 is a block diagram illustrating another control unit configured to provide signals to multiple control devices in accordance with some embodiments.

FIG. 8 is a block diagram illustrating another example wherein an interface control unit 813 is implemented in a control unit. The control unit can, for example, be similar to micro-controller 110 described above. Control unit 813 can be configured to provide signals to multiple control devices in accordance with some embodiments. For example, interface control unit 813 can be configured for use in micro-controller 110 coupling to a set of external devices 130 such as devices 131 and 132 described above. In one embodiment control unit 813 has multiple ingress circuit portions 801, 802, 806, 807. A circuit portion can be a line or any combination of passive and/or active circuit element. In an embodiment signals are to be provided to the respective ingress circuit portions at a first voltage such as 1.3V; herein the first voltage will also be referred to as 'low' voltage.

In an embodiment interface control unit 813 is coupled to output driver unit 814. In an embodiment output driver unit 814 can form part or otherwise be comprised in interface control unit 813. Output driver unit 814 comprises multiple output pads 811, 812, 816, 817 that can be configured for output of 'high' voltage signals at a second voltage, for example as 5V signals, to an interface (not shown); herein the second voltage will also be referred to as 'high' voltage. The 'low' voltage can be applied, merely as an example, to perform signalling internal to a micro-controller while the 'high' voltage can be applied to perform signalling external to the micro-controller such as on a bus between the micro-controller and devices coupled to the micro-controller by the bus. Accordingly, ingress circuit portions 801, 802, 806, 807 can pick up a low voltage signals and pass the respective signal on to one associated output pad, respectively, in the multiple output pads 811, 812, 816, 817, and can be assigned to support transmission of an associated 'high' voltage signal. In an embodiment output pad 816a is to support transmission of a positive data output signal and output pad 816b is to support transmission of negative data output signal; the positive data output signal and the negative data output signal together to form differential data signal SO. In an embodiment output pad 816a is to support transmission of a positive clock signal and output pad 816b is to support transmission of negative clock signal; the positive clock signal and the negative clock signal together to form differential clock signal $F_{CL}$. In an embodiment output pad 811 can be to support transmission of a first enable signal to be associated with the first coupled device 131. In an embodiment output pad 812 can be to support transmission of a second enable signal to be associated with the second coupled device 132.

In an embodiment of interface control unit 813, a set of signal lines 831, 832, 836, 837 can be provided for coupling of one ingress circuit portion 801, 802, 806, 807 to the associated output pad 811, 812, 816, 817. In an embodiment of the set of signal lines 831, no two signal lines 831a, 831b, 831c, . . . , 831n have the same length. In an embodiment output driver unit 814 comprises selector units 821, 822, 826 and 827. The selector units each have multiple ingress ports; for example, selector unit 821 can have at least four ingress ports. In the set of signal lines 831, each signal line 831a, 831b, 831c, . . . , 831n can be connected to one of the multiple ingress ports of selector unit 821, respectively. At least one effect can be that selector unit 821 can be set to select, for transmission to output pad 811, a signal received on one signal line, for example signal line 831b, in the set of signal lines 831, so as to achieve a desired timing. In one embodiment desired timing may be set so as to obtain, for a signal travelling from micro-controller 110 to a coupled device, further for processing the signal in the coupled device, and for transmitting a responsive signal from the coupled device to micro-controller 110, a delay essentially equivalent or equal to one period in the periodic clock signal $F_{CL}$. Thus, differences in signal processing and/or transmission speed between different output pad may also be compensated. For example, use of a relatively 'fast' low voltage differential signal circuit for the clock signal $F_{CL}$ and use of a comparatively 'slow' CMOS circuit for the enable signal EN.

Figure 9:
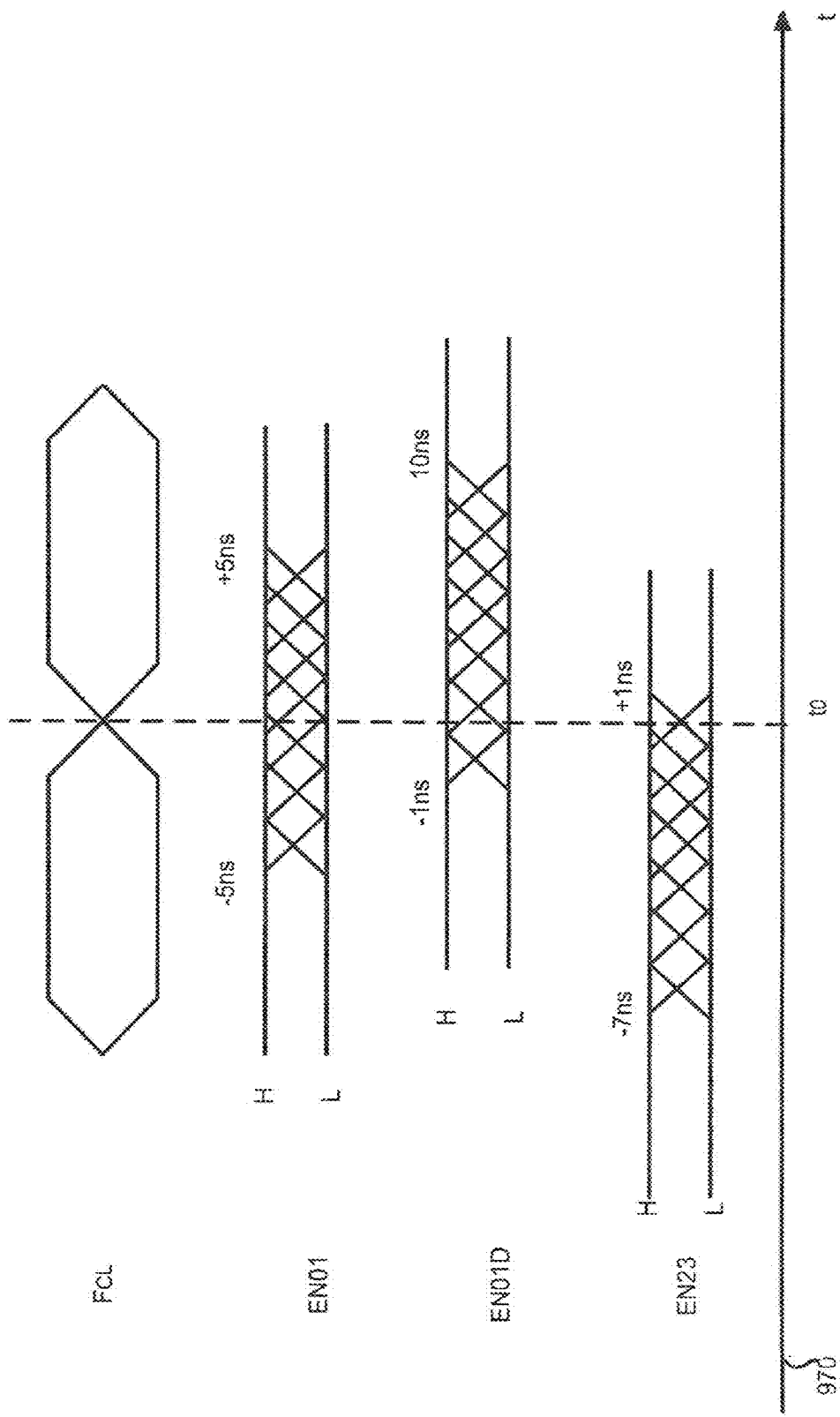
FIG. 9 is an example timing diagram illustrating operation according to one embodiment as illustrated in FIG. 8.

FIG. 9 is an example timing diagram illustrating operation according to one embodiment as illustrated in FIG. 8. Differential clock signal $F_{CL}$ is shown having state changes at a reference point in time $t_0$. Enable signal EN01 can be seen to have an earliest state transition from H to L approximately 5 ns before reference time $t_0$. This transition can be where enable signal EN01 travels the shortest line 831*a* in the set of signal lines 831 from ingress circuit portion 801 to output pad 811. Enable signal EN01 can be seen to have a latest state transition from H to L at approximately 5 ns after reference time $t_0$. This transition can be where enable signal EN01 travels the longest line 831*n* in the set of signal lines 831 from ingress circuit portion 801 to output pad 811. Enable signal EN01D can be seen to have an earliest state transition from H to L approximately 1 ns before reference time $t_0$. This transition can be where enable signal EN01D travels the shortest line 832*a* in the set of signal lines 832 from ingress circuit portion 802 to output pad 812. Enable signal EN01D can be seen to have a latest state transition from H to L at approximately 10 ns after reference time $t_0$. This transition can be where enable signal EN01D travels the longest line 832*n* in the set of signal lines 832 from ingress circuit portion 802 to output pad 812. Enable signal EN23 can be seen to have an earliest state transition from H to L approximately 7 ns before reference time $t_0$. This transition can be where enable signal EN23 travels the shortest line 836*a* in the set of signal lines 836 from ingress circuit portion 806 to output pad 816. Enable signal EN23 can be seen to have a latest state transition from H to L at approximately 1 ns after reference time $t_0$. This transition can be where enable signal EN23 travels the longest line 836*n* in the set of signal lines 836 from ingress circuit portion 806 to output pad 816.

Example implementations/embodiments discussed herein may have various components collocated; however, it should be appreciated that the components of the arrangements may be combined into one or more apparatuses.

The above-described systems, implementations, embodiments, arrangements, apparatuses and methods may be implemented in firmware, hardware, software, one or more software modules, one or more software and/or hardware testing modules, test equipment, one or more transceivers, one or more wired and/or wireless wide/local area network systems, one or more satellite communication systems, network-based communication systems (such as an IP, Ethernet or ATM system), one or more modems equipped with diagnostic capabilities, or the like, or on one or more separate programmed general purpose computers having a communications device or in conjunction with any of the following communications protocols: MicroSecond Channel Interface (MSC Protocol) or the like.

Additionally, the implementations, arrangements, procedures and protocols of the described implementations may be implemented on a special purpose computer, a programmed microprocessor or micro-controller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed embodiments, implementations and procedures may be readily implemented in software using object or object-oriented software development environments that provide a portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium, executed on a programmed general-purpose computer with the co-operation of a controller and memory, a special purpose computer, a microprocessor, or the like. In these instances, the arrangements and procedures of the described implementations may be implemented as a program embedded on a personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system.

The implementations herein are described in terms of example embodiments. However, it should be appreciated that individual aspects of the implementations may be separately claimed and one or more of the features of the various embodiments may be combined. In the above description of example implementations, for purposes of explanation, specific numbers, materials configurations, and other details are set fourth in order to better explain the invention, as claimed. However, it will be apparent to one skilled in the art that the claimed invention may be practiced using different details than the examples described herein. In other instances, well-known features are omitted or simplified to clarify the description of the example implementations.

The inventors intend the described example embodiments/implementations to be primarily examples. The inventors do not intend these example embodiments/implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary methods/processes discussed herein comprise a sequence of operations that can be implemented with hardware, software, firmware, or some combination thereof.

In the context of software/firmware, the blocks represent instructions stored on one or more processor-readable storage media that, when executed by one or more processors, perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Moreover, the described implementations may be similarly executed and realized by way of such hardware, software, firmware, or some combination thereof.

Note that the order in which the embodiments/implementations and methods/processes are described is not intended to be construed as a limitation, and any number of the described implementations and processes may be combined.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

Although the disclosure has been shown and described with respect to one or more implementations, equivalent alterations and modifications will occur to others skilled in the art based upon a reading and understanding of this specification and the annexed drawings. For example, although some implementation were described above with respect to a capture and compare module, other un-illustrated implementations can include only capture functionality (not compare functionality) or can include only compare functionality (not capture functionality). Other permutations and combinations of the above-disclosed concepts are also contemplated as falling within the scope of the disclosure. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

The invention claimed is:

1. A method for an apparatus to communicate with a device, comprising:
   transmitting, from the apparatus to the device, a clock signal having a periodic elementary pattern;
   wherein a housing of the apparatus and a housing of the device are remote from one another, wherein the periodic elementary pattern encompasses a first cycle pattern and a second cycle pattern, and wherein the first cycle pattern differs from the second cycle pattern;
   transmitting, from the apparatus to the device, a control signal having periodic transitions between signal states, wherein the periodic transitions in the control signal coincide with the second cycle pattern in the clock signal;
   at the apparatus, receiving from the device, an asynchronous signal; and
   extracting information from the asynchronous signal based on the clock signal, wherein a period of the clock signal encompasses more than one clock cycle.

2. The method of claim 1, further comprising using the clock signal for constructing the asynchronous signal to represent the extracted information.

3. The method of claim 1, further comprising:
   determining an occurrence of the periodic transition in the control signal by counting cycles in the clock signal.

4. The method of claim 1, wherein, in the periodic elementary pattern,
   the first cycle pattern has a second signal in a first state for a first duration and in a second state for a second duration,
   the second cycle pattern has the second signal in the first state for a third duration and in the second state for a fourth duration, and
   the third duration differs from the first duration and/or the fourth duration differs from the second duration.

5. The method of claim 1, wherein the clock signal comprises a digital signal.

6. The method of claim 1, wherein the first cycle pattern exhibits a spacing in time from a leading edge thereof to a falling edge thereof or from the falling edge thereof to a next leading edge thereof that differs from that of the second cycle patter.

7. An apparatus to communicate with a device, wherein a housing of the apparatus and a housing of the device are remote from one another,
   the apparatus configured to provide a first signal and a second signal,
   the apparatus further configured to receive a third signal,
   the first signal having a transition between two signal states,
   the second signal having a periodicity with a periodic elementary pattern encompassing at least one first cycle pattern,
   the periodic elementary pattern of the second signal further comprising a second cycle pattern, wherein the second cycle pattern differs from the first cycle pattern, and
   the apparatus configured to extract information from the third signal based on a timing of the third signal being associated with a timing of the second signal; and
   the apparatus further configured to transmit to the device a control signal having periodic transitions between signal states, wherein the periodic transitions in the control signal coincide with the second cycle pattern in the second signal.

8. The apparatus of claim 7, wherein, in the second signal, signal timing in the second cycle pattern differs from signal timing in the first cycle pattern.

9. The apparatus of claim 8, wherein, in the second signal, a duration of the second cycle pattern is equal to or is larger than a duration of the first cycle pattern.

10. The apparatus of claim 7, the apparatus configured to extract information from the third signal based on the third signal being asynchronous.

11. The apparatus of claim 7, wherein the first cycle pattern has the second signal in a first state for a first duration and in a second state for a second duration, the second cycle pattern has the second signal in the first state for a third duration and in the second state for a fourth duration, and the third duration differs from the first duration and/or the fourth duration differs from the second duration.

12. The apparatus of claim 7, wherein the first signal is periodic.

13. The apparatus of claim 7, the apparatus further configured to determine the transition to occur in the first signal by counting cycles in the second signal.

14. The apparatus of claim 7, wherein the second signal comprises a digital signal.

15. The apparatus of claim 7, wherein the first cycle pattern exhibits a spacing in time from a leading edge thereof to a falling edge thereof or from the falling edge thereof to a next leading edge thereof that differs from that of the second cycle pattern.

* * * * *